United States Patent
Lord (10) Patent No.: US 9,515,913 B2
(45) Date of Patent: Dec. 6, 2016

(54) METHOD PROVIDING ADHOC NETWORK STATE TO SUPPORT DISTRIBUTED SCHEDULING

(75) Inventor: Bruce J. Lord, Redmond, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/490,131

(22) Filed: Jun. 6, 2012

(65) Prior Publication Data

US 2013/0329648 A1 Dec. 12, 2013

(51) Int. Cl.
| | |
|---|---|
| *H04L 12/727* | (2013.01) |
| *H04W 40/02* | (2009.01) |
| *H04L 12/733* | (2013.01) |
| *H04L 12/701* | (2013.01) |
| *H04L 12/751* | (2013.01) |
| *H04L 12/721* | (2013.01) |
| *H04W 84/18* | (2009.01) |

(52) U.S. Cl.
CPC ............... *H04L 45/02* (2013.01); *H04L 45/12* (2013.01); *H04W 84/18* (2013.01)

(58) Field of Classification Search
CPC .. H04W 72/02; H04W 84/18; H04W 52/0219; H04W 52/0216; H04L 45/02; H04L 45/306; H04L 45/34; H04L 45/12; H04B 7/2656
USPC ............... 370/254, 338, 328, 256, 349, 351, 370/395, 229, 230, 235, 449, 315, 392, 370/311, 321, 326, 329, 337, 347, 476, 370/238, 252; 709/241
See application file for complete search history.

(56) References Cited

U.S. PATENT DOCUMENTS

| | | | |
|---|---|---|---|
| 5,742,593 A | 4/1998 | Sharony et al. | |
| 6,788,702 B1 | 9/2004 | Aceves et al. | |
| 7,386,002 B2 | 6/2008 | Meier | |
| 7,466,664 B2 * | 12/2008 | Ghosh et al. | 370/254 |
| 7,489,690 B2 * | 2/2009 | Kakadia | 370/395.4 |
| 7,656,851 B1 * | 2/2010 | Ghanadan et al. | 370/338 |
| 7,672,281 B1 | 3/2010 | Humphries et al. | |
| 8,396,022 B1 * | 3/2013 | Lindsay | H04L 45/34 370/321 |

(Continued)

FOREIGN PATENT DOCUMENTS

EP 1936870 A1 6/2008

OTHER PUBLICATIONS

Routing in Clustered Multihop, Mobile Wireless Networks with Fading Channel, Ching-Chuan Chiang, Hsiao-Kuang Wu, Windston Liu, Mario Gerla, Computer Science Department, UCLA.

(Continued)

*Primary Examiner* — Alpus H Hsu
*Assistant Examiner* — Camquyen Thai
(74) *Attorney, Agent, or Firm* — Toler Law Group, P.C.

(57) ABSTRACT

A computer-based system to schedule network traffic in a communication network includes a processor coupled to a first node of a network, a memory module coupled to the processor. Logic instructions are stored on a tangible computer readable medium which, when executed by the processor, configure the processor to receive at the first node of the network, situational awareness information from at least a second network node which is directly accessible by the first node, identify, in the first node, situational awareness information commonly known by multiple nodes across the network, generate a network schedule based on the commonly known situational information, generate a shortest path routing table from the first node to all other network nodes based on the network schedule, and route network traffic at the first node using the network schedule.

17 Claims, 5 Drawing Sheets

(56) References Cited

U.S. PATENT DOCUMENTS

| | | | |
|---|---|---|---|
| 8,493,943 B1* | 7/2013 | Segall et al. | 370/338 |
| 2005/0018667 A1* | 1/2005 | Chandra et al. | 370/389 |
| 2006/0007951 A1* | 1/2006 | Meier | 370/449 |
| 2008/0049657 A1* | 2/2008 | Feng et al. | 370/315 |
| 2008/0159144 A1* | 7/2008 | Nagarajan et al. | 370/235 |
| 2008/0186907 A1* | 8/2008 | Yagyuu et al. | 370/328 |
| 2009/0129316 A1* | 5/2009 | Ramanathan et al. | 370/328 |
| 2009/0185508 A1 | 7/2009 | Duke et al. | |
| 2009/0232038 A1* | 9/2009 | Gonzalez-Velazquez | H04B 7/2656 370/311 |
| 2010/0246492 A1 | 9/2010 | Scarlatti | |
| 2013/0301471 A1* | 11/2013 | Brown et al. | 370/254 |
| 2014/0016645 A1* | 1/2014 | Nomura et al. | 370/392 |

OTHER PUBLICATIONS

Distributed Scheduling for Multi-Hop Wireless Networks, Loc Bui, Atilla Eryilmax, R. Srikant, Xinzhou Wu.

Abhinav Gupta, Xiaojun Lin and R. Srikant, "Low-Complexity Distributed Scheduling Algorithms for Wireless Networks," IEEE/ACM Transactions on Networking, vol. 17, No. 6, pp. 1846-1859, Dec. 2009.

Anthony Ephremides, Fellow, IEEE, and Thuan V. Truong, Member, IEEE, Scheduling Broadcasts in Multihop Radio Networks, IEEE Transactions on Communications, vol. 38, No. Apr. 4, 1990.

L. Tassiulas and A. Ephremides, ¿Stability properties of constrained queuing systems and scheduling policies for maximum throughput in multihop radio networks, ¿IEEE Transactions on Automatic Control, pp. 1936¿1948, Dec. 1992.

Patents Act 1977: Search Report under Section 17(5) for Application No. GB1309677.1, Dated Dec. 9, 2013, 3 pages.

Examination Report under Section 18(3) for GB Application No. 1309677.1 from the Intellectual Property Office—United Kingdom; dated Jan. 21, 2016; [3 pages].

Examination Report under Section 18(3) for GB Application No. 1309677.1 from the Intellectual Property Office—United Kingdom; dated Apr. 5, 2016, 2 pages.

* cited by examiner

METHOD PROVIDING ADHOC NETWORK STATE TO SUPPORT DISTRIBUTED SCHEDULING

BACKGROUND

Ad hoc communication networks comprise a number of nodes corresponding to one or more transmitter/receiver pairs. For any node, there will be some nearby nodes that are in range for direct communication, and these are commonly referred to as neighbor, or one-hop nodes. Other nodes will be out of range for direct communication and so may only be contacted indirectly with multiple hops via intermediate nodes. The ad hoc nature of the network means that, for any particular message, there may be many possible routes through different intermediate nodes that connect a source node with a destination node.

Mobile networks are inherently dynamic and ad-hoc. Continuous communications between mobile terminals in an ad-hoc network necessitates sharing of each terminal's state, link status, available bandwidth, and information traffic demands. As mobile networks increase in size the load on the network to support this maintenance or network situation awareness information sharing takes an ever increasing percentage of the total bandwidth.

Accordingly, systems and methods to support the distribution and employment of network situation awareness information for distributed scheduling of bandwidth in ad-hoc networks may find utility.

SUMMARY

Embodiments of systems and methods in accordance with the present disclosure may provide a protocol for distributed bandwidth scheduling which may be implemented in the nodes of an ad-hoc network.

In one embodiment, a computer-implemented method to schedule network traffic in a communications network comprises receiving at a first node of the network, situational awareness information from at least a second network node which is directly accessible by the first node, identifying, in the first node, situational awareness information commonly known by multiple nodes across the network, generating a network schedule based on said commonly known situational information and routing network traffic at the node using said network schedule.

In another embodiment, a computer-based system to schedule network traffic in a communication network comprises a processor coupled to a first node of a network, a memory module coupled to the processor and comprising logic instructions stored on a tangible computer readable medium which, when execute by the processor, configure the processor to receive at the first node of the network, situational awareness information from at least a second network node which is directly accessible by the first node, identify, in the first node, situational awareness information commonly known by multiple nodes across the network, generate a network schedule based on said commonly known situational information, generate a shortest path/hops routing table from the first node to all other network nodes using the generated network schedule and route network traffic at the first node using said routing table.

In a further embodiment, a computer program product comprising logic instructions stored on a tangible computer readable medium which, when execute by the processor, configure the processor to implement a method to schedule network traffic in a communication network by performing operations comprising receiving at a first node of the network, situational awareness information from at least a second network node which is directly accessible by the first node, identifying, in the first node, situational awareness information commonly known by multiple nodes across the network, generating a network schedule based on said commonly known situational information and routing network traffic at the node using said network schedule.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Embodiments of methods and systems in accordance with the teachings of the present disclosure are described in detail below with reference to the following drawings.

DETAILED DESCRIPTION

Systems, methods, and computer program products to provide a method to support distributed bandwidth scheduling in a wireless, ad-hoc network are described herein. Specific details of certain embodiments are set forth in the following description and in the Figures to provide a thorough understanding of such embodiments. One skilled in the art will understand, however, that alternate embodiments may be practiced without several of the details described in the following description.

In some embodiments, each network node maintains a chronological set of network situation awareness snapshots/frames for a duration that exceeds the maximum information transit time across the network. The snapshots are stored at the end of each schedule end time. The first node reads its neighbors' time tagged network situation awareness information and updates its appropriate network situation awareness frames with the new information. In conjunction with this embodiment the first node determines the maximum time or hops for information transit across the network and uses that time/hops to select the network situation awareness information frame to pass to the network bandwidth scheduler for determining the upcoming schedule frame. The selected network situation awareness frame passed to the distributed bandwidth scheduler is common to all network nodes since it will no longer receive any new updates.

Figure 1:
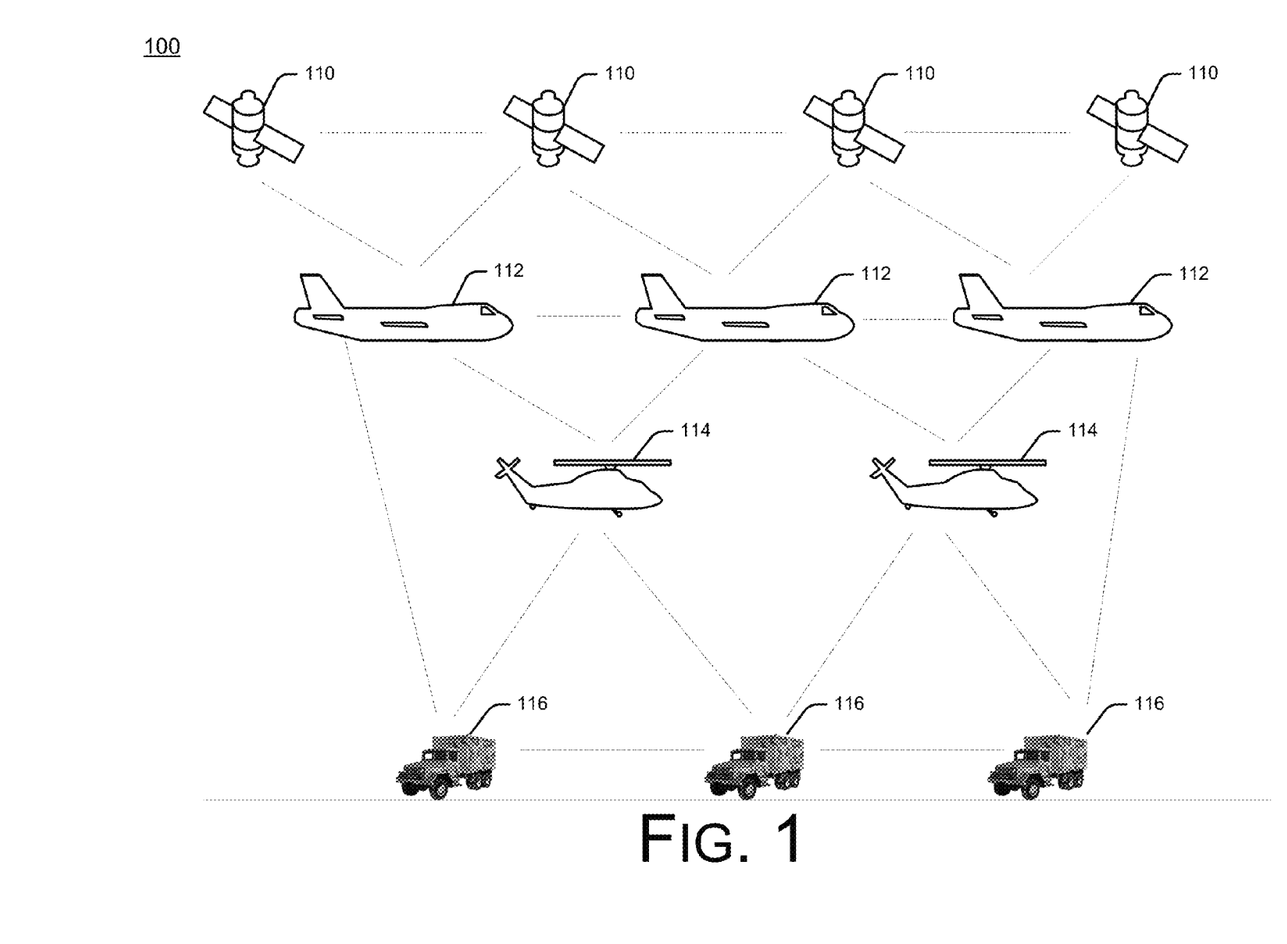
FIG. 1 is a schematic illustration of an ad-hoc network, according to embodiments.

FIG. 1 is a schematic illustration of an ad-hoc network, according to embodiments. Referring to FIG. 1, the wireless network 100 comprises a plurality of nodes which can receive and/or transmit communication across the network. In the embodiment depicted in FIG. 1 the nodes are mobile and may comprise one or more satellites 110, one or more aircraft such as airplanes 112 and helicopters 114, and one or more ground-based vehicles 116. The various vehicles which comprise the nodes may be referred to generically herein by the term "mobile platform." In the embodiment depicted in FIG. 1 the various network nodes are mobile. Thus the number of nodes in the network and the network configuration may vary over time as the satellites, aircraft, and vehicles move relative to one another. Further, nodes may be added to the network 100 when a mobile platform moves into range to communicate with another mobile platform that is a part of the network 100, or may be removed from the network 100 when a mobile platform moves out of range to communicate with another node in the network. In some embodiments the network may also comprise one or more fixed, ground based nodes.

Direct communication is possible between certain pairs of nodes as indicated by the dashed lines between the nodes. Whether a pair of nodes can form a direct link may be determined by multiple factors such as the distance between the nodes, the power at which a node transmits, whether any obstacles exist between the nodes, etc. For example, the effects of the prevailing weather and altitudes of one or both the nodes may be taken into account as they may alter the distance over which a direct link may be maintained.

The nodes form a mesh covering the ad hoc network 100. Certain parts of the mesh may be well populated with nodes, while other parts of the mesh may be sparsely populated with nodes, forming holes in the mesh.

A message may travel between any pair of nodes either directly or via other nodes where a direct link between the nodes is not available. Each node treats an outgoing message in the same way, irrespective of whether the message originates from that node or whether the message was received for forwarding. Hence, a message is likely to pass through a number of nodes, each of which will act in the same manner as they forward the message. Hence, effectively, each node forwarding the message becomes a transmit node for the next hop of the message's route.

In the network depicted in FIG. 1 each of the nodes may function as both a source node which originates communications and as a destination node which receives communications. Each node computes a routing table reflecting the communication paths through the ad hoc network 100 and may also determine which neighbor node to send a message for forwarding to a particular destination node. A source node may also maintain a limited number of links to neighbor nodes as active and leave a number of links to neighbor nodes as inactive based on the bandwidth as scheduled. Maintaining active links may include reconfiguring the links in response to changes in the relative position of the nodes in the network 100.

Figure 2:
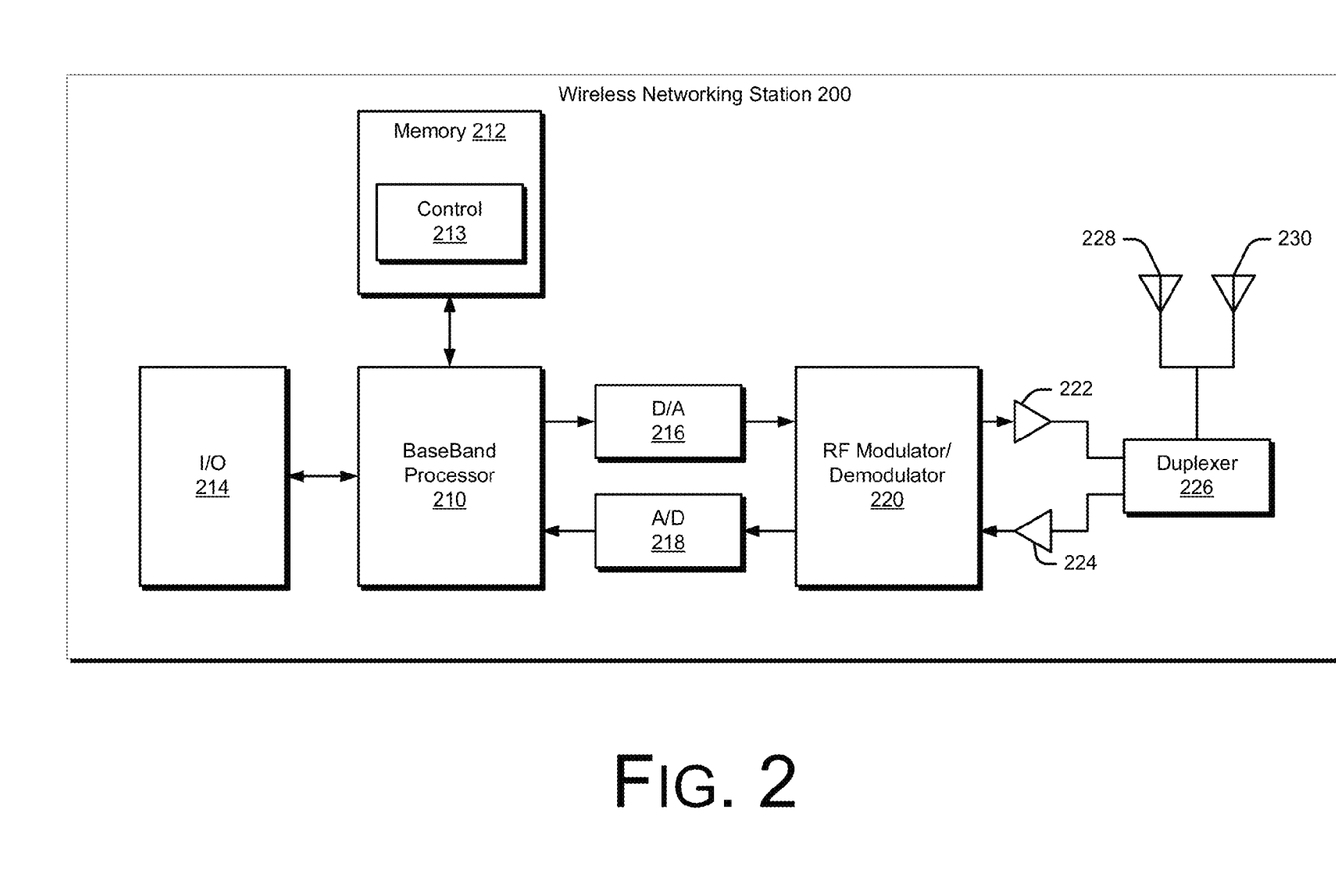
FIG. 2 is a schematic illustration of a mobile, wireless networking station, according to embodiments.

In some embodiments each node in the network 100 may comprise a wireless networking station which enables the node to send and receive messages across the network 100. Referring now to FIG. 2, a block diagram of a wireless network station 200 in accordance with one or more embodiments will be discussed. FIG. 2 illustrates an example block diagram of wireless network station 200 which may be included within a satellite 110, an aircraft 112, 114, or a land-based vehicle 116, as depicted in FIG. 1. FIG. 2 depicts the major elements of an example wireless network station 200, however fewer or additional elements may be included in alternative embodiments in addition to various other elements that are not shown herein, and the scope of the claimed subject matter is not limited in these respects.

Wireless network station 200 may comprise a baseband processor 210 coupled to memory 212 for performing the control functions of wireless network station 200. Input/output (I/O) block 214 may comprise various circuits for coupling wireless network station 200 to one or more other devices. For example, I/O block 214 may include one or more Ethernet ports and/or one or more universal serial bus (USB) ports for coupling relay station 200 to modem 220 or other devices. For wireless communication, relay station 200 may further include a radio-frequency (RF) modulator/demodulator for modulating signals to be transmitted and/or for demodulating signals received via a wireless communication link. A digital-to-analog (D/A) converter 216 may convert digital signals from baseband processor 210 to analog signals for modulation and broadcasting by RF modulator/demodulator via analog and/or digital RF transmission techniques. Likewise, analog-to-digital (A/D) converter 218 may convert analog signals received and demodulated by RF modulator/demodulator 220 digital signals in a format capable of being handled by baseband processor 210. Power amplifier (PA) 222 transmits outgoing signals via one or more antennas 228 and/or 230, and low noise amplifier (LNA) 224 receives one or more incoming signals via antennas 228 and/or 230, which may be coupled via duplexer 226 to control such bidirectional communication. In one or more embodiments, wireless network station 200 may implement single input, single output (SISO) type communication, and in one or more alternative embodiments wireless network station 200 may implement multiple input, multiple output (MIMO) communications, although the scope of the claimed subject matter is not limited in these respects.

In some embodiments a wireless networking station 200 will implement communication protocols to facilitate distributed bandwidth scheduling in network 100. In such embodiments a control module 213 may implement communication operations in accordance with the description provided herein. In some embodiments the control module 213 may be implemented as logic instructions stored in the computer readable medium of memory 212. When executed by a processor, e.g., the baseband processor 210 or another processor in or coupled to wireless networking station, the control module 213 may implement one or more operations to manage information distribution for distributed bandwidth scheduling between network nodes.

Figure 3:
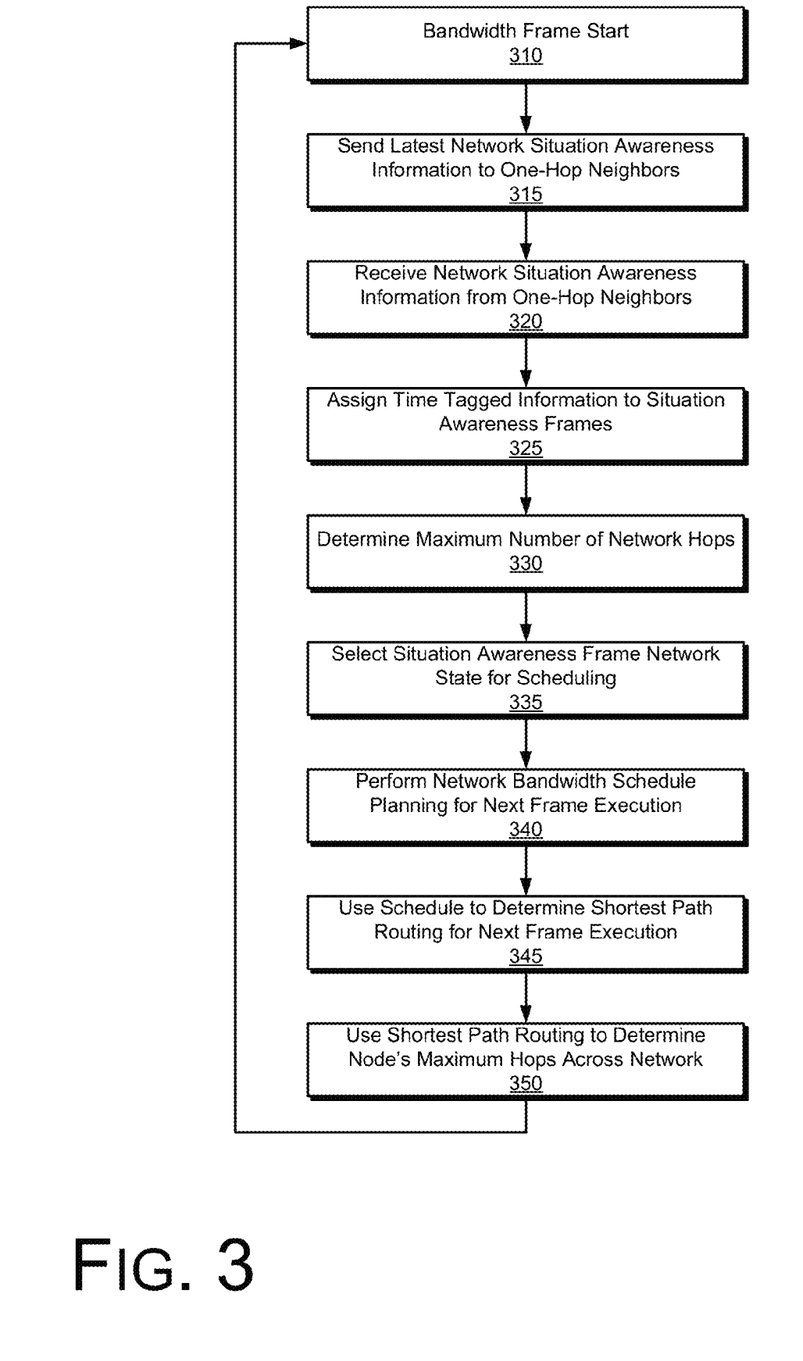
FIG. 3 is a flowchart illustrating operations in methods for distributed bandwidth scheduling, according to embodiments.
Figure 4:
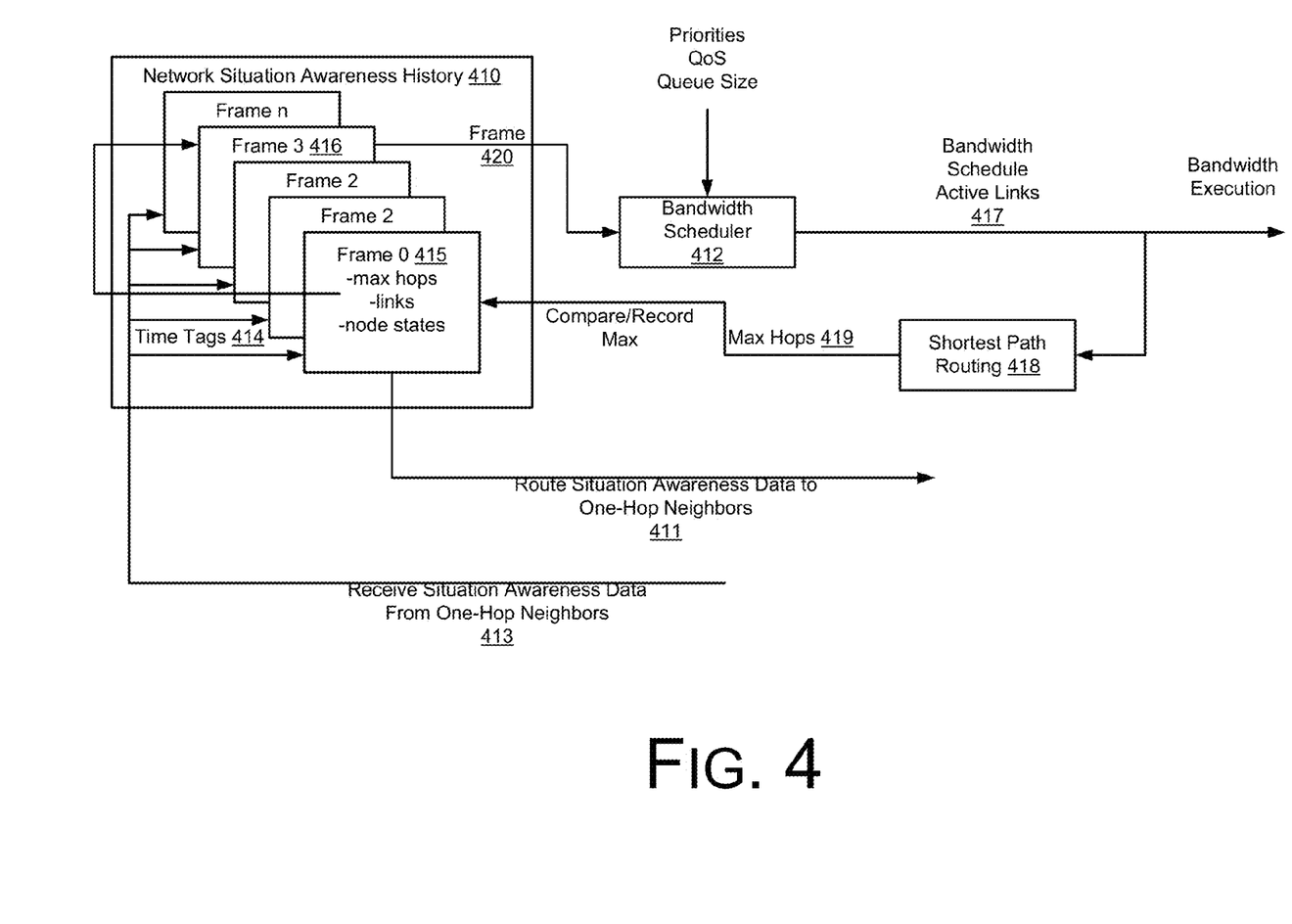
FIG. 4 is a schematic illustration of a method for distributed bandwidth scheduling, according to embodiments.

FIG. 3 is a flowchart illustrating operations in methods to implement distributed bandwidth scheduling, according to embodiments, and FIG. 4 is a schematic illustration of a method for supporting distributed bandwidth scheduling, according to embodiments. Operations in a method to implement support of distributed bandwidth scheduling will be explained with reference to FIGS. 3 and 4.

By way of overview, the method described herein efficiently distributes the information necessary for distributed network scheduling of bandwidth resources to support point-to-point, wireless communications between mobile terminals. The method uses scheduled communications between localized/neighbor terminals, for total network wide distributed schedule optimization to more efficiently allocate total network bandwidth resources by distributed schedulers on each terminal. In some embodiments the same scheduling algorithm is executed on each terminal and operates on the same global situation awareness information to provide a low latency technique.

The method described herein distributes each node's latest network information only to its immediate one hop neighbors. Each node uses knowledge about the maximum end-to-end time for information to flow across the network to identify what information is common to all network terminals. The distributed network scheduling algorithm on each terminal uses network wide converged information common on every network terminal. Thus the outcome of the scheduler is the same on each of the terminals and total network bandwidth scheduling may be accomplished using a lowest possible latency method that requires no negotiations and without exchanging schedules between nodes.

Referring to FIGS. 3-4, in some embodiments each terminal maintains network situation awareness (SA) information 410 in a bandwidth scheduler frame time structure, such as indicated by frame 0 through frame n in FIG. 4. By way of example, a bandwidth scheduler may produce one frame time (e.g., 0.1 seconds) of transmit and receive control commands for all active communication links in the network. This schedule may be executed at the start of each frame (operation 310).

At operation 315 and 411 the network situation awareness information is sent by each network node to the one-hop neighbors in network 100. In some embodiments each node sends its frame 0 situational awareness data, which contains the transmitting node's latest situational awareness information about the entire network. That information is time tagged by the originating node, not the node that is transmitting the situational awareness frame 0 information. The content of this frame of information is all of the information necessary for the bandwidth scheduler 412 to perform its task. By way of example, in some embodiments the situational awareness information may include but not limited to node state information, link status information, information traffic demands, link traffic demands, and maximum network hop information. The situational awareness information may be transmitted 411 on a priority basis in multiplexed transmission data units (TDUs).

At operation 320 and 413 the node receives network situation awareness information transmitted by its one-hop neighbors. Thus, each node in the network receives the network situational awareness information from all its one-hop nodes. At operation 325 and 414 the node assigns the time tagged received information to the appropriate situational awareness frames. In some embodiments each terminal maintains its network situation awareness time tagged information over a number of frames that exceeds the maximum number of shortest path hops across the network (assuming 1 hop per frame time).

At operation 330 and 415 the node determines the maximum number of network hops from each node's maximum hops across the network in the network situation awareness information. At operation 335 the node selects the situational awareness frame network state for scheduling. In some embodiments the node uses the network's maximum shortest path hops 416 and the frame time tag to select the appropriate latent network situation awareness frame 420 for calculating the network bandwidth optimal schedule. By way of example in some embodiments the frame is selected such that the Network Situation Awareness Frame Number is equal to the network maximum shortest path hops. By way of another example the accumulated transmit times in the current bandwidth schedule 417 with the current shortest path routing 418 is used to determine the maximum transit time 419 from this node across the network which is used by 415 to select the appropriate Network Situation Awareness Frame Number 416 to provide to the scheduler 420. In this manner, each node uses knowledge about the maximum end-to-end time for information to flow across the network to identify what information is common to all network terminals.

At operation 340 and 412 the node performs network bandwidth schedule planning for the next frame execution. In some embodiments the node calculates a network bandwidth schedule using network situation awareness frame selected in operation 335 and 416. Since each terminal has converged global network information determined by network max hops or max transit time, the distributed schedulers know where all the terminals are with their demands, priorities, and link states. Projecting each node's location to its next scheduled link execution time is possible by maintaining tracks from the situation awareness history frames. Each terminal can schedule the entire network independently with the same result using the same topology and interference mitigation rules. Because the network information is global, interference mitigation may be performed on a network-wide basis.

At operation 345 and 418 the schedule developed in operation 340 and 412 may be used to determine a shortest path routing from this node for the next frame execution. In some embodiments the schedule identifies the active links in the next frame such that the shortest path from the first node to all other nodes in the network may be calculated. This routing information may be used in the next executed frame to route forward traffic.

Finally, at operation 350 and 419 shortest path routing from the first node may be used to determine the first node's maximum hops across the network. In some embodiments, the maximum hops (shortest path) from the first node across the network may be calculated and inserted into the network situation awareness frame 0. Prior to completion of the current executing bandwidth schedule each network situation awareness frame is pushed down the stack, i.e., frame n−1 is set to frame n, and on up the stack, frame 0 is copied to frame 1, and the frames will be updated with the upcoming active frame received neighbor data).

Control then passes back to operation 310 and operations 310-350 are repeated for the current terminal as the current frame. Thus, operations 310-350 define a loop by which a network node may support distributed scheduling of bandwidth for transmissions across the network. In practice, each node on the network may include a bandwidth scheduler which implements the operations depicted in FIG. 3. Further, because each node executes the same algorithm using the same information set, each node will produce the same bandwidth allocation solution.

Figure 5:
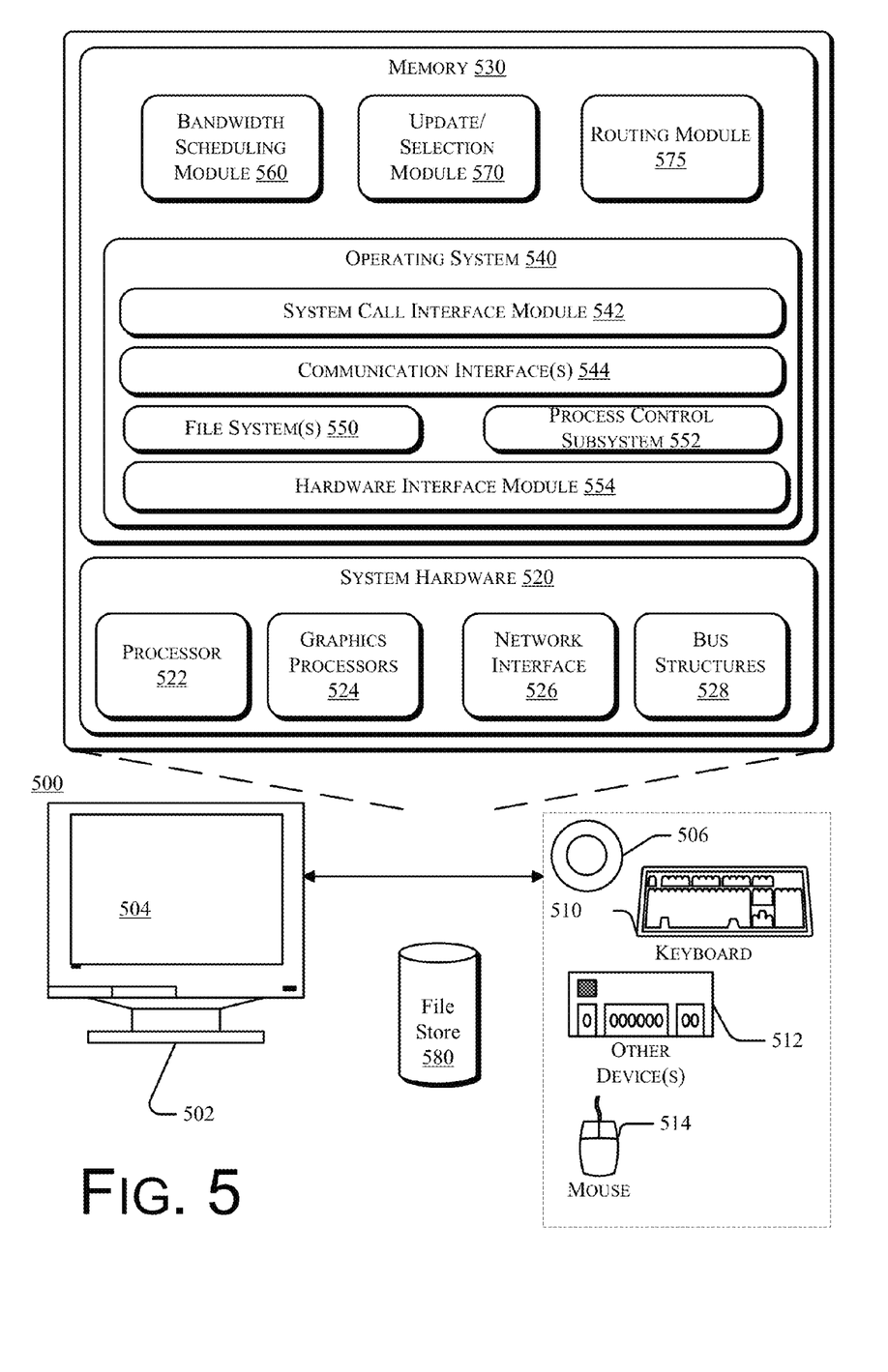
FIG. 5 is a schematic illustration of a computer-based system to implement distributed bandwidth scheduling, according to embodiments.

In some embodiments the bandwidth selection operations depicted in FIGS. 3-4 may be implemented by a computing system coupled to the respective network nodes. FIG. 5 is a schematic illustration of a computing system. In one embodiment, system 500 comprises one or more input/output devices including a display 502 having a screen 504, one or more speakers 506, a keyboard 510, one or more other I/O device(s) 512, and a mouse 514. The other I/O device(s) 512 may include a touch screen, a voice-activated input device, a track ball, and any other device that allows the system 500 to receive input from a user.

The computing system 500 includes system hardware 520 and memory 530, which may be implemented as random access memory and/or read-only memory. A file store 580 may be communicatively coupled to computing system 500. File store 580 may be internal to computing device 108 such as, e.g., one or more hard drives, CD-ROM drives, DVD-ROM drives, or other types of storage devices. File store 580 may also be external to computer 530 such as, e.g., one or more external hard drives, network attached storage, or a separate storage network.

System hardware 520 may include one or more processors 522, a graphics processor(s) 524, network interfaces 526, and bus structure(s) 528. As used herein, the term "processor" means any type of computational element, such as but not limited to, a microprocessor, a microcontroller, a complex instruction set computing (CISC) microprocessor, a reduced instruction set (RISC) microprocessor, a very long instruction word (VLIW) microprocessor, or any other type of processor or processing circuit.

Graphics processor(s) 524 may function as adjunct processors that manage graphics and/or video operations. Graphics processor(s) 524 may be integrated onto the motherboard of computing system 500 or may be coupled via an expansion slot on the motherboard.

In one embodiment, network interface 526 could be a wired interface such as an Ethernet interface (see, e.g., Institute of Electrical and Electronics Engineers/IEEE 802.3-2002) or a wireless interface such as an IEEE 802.11a, b or g-compliant interface (see, e.g., IEEE Standard for IT-Telecommunications and information exchange between systems LAN/MAN—Part II: Wireless LAN Medium Access Control (MAC) and Physical Layer (PHY) specifications Amendment 4: Further Higher Data Rate Extension in the 2.4 GHz Band, 802.11G-2003). Another example of a wireless interface would be a general packet radio service (GPRS) interface (see, e.g., Guidelines on GPRS Handset Requirements, Global System for Mobile Communications/GSM Association, Ver. 3.0.1, December 2002).

Bus structures 528 connect various components of system hardware 528. In one embodiment, bus structures 528 may be one or more of several types of bus structure(s) including a memory bus, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

Memory 530 may include an operating system 540 for managing operations of computing device 500. In one embodiment, operating system 540 includes a hardware interface module 554 that provides an interface to system hardware 520. In addition, operating system 540 may include a file system 550 that manages files used in the operation of computing device 500 and a process control subsystem 552 that manages processes executing on computing system 500.

Operating system 540 may include (or manage) one or more communication interfaces that may operate in conjunction with system hardware 520 to transceive data packets and/or data streams from a remote source. Operating system 540 may further include a system call interface module 542 that provides an interface between the operating system 540 and one or more application modules resident in memory 530. Operating system 540 may be embodied as a Windows® brand operating system or as a UNIX operating system or any derivative thereof (e.g., Linux, Solaris, etc.), or other operating systems including real time operating systems such as QNX.

In one embodiment, memory 530 includes a bandwidth scheduling module 560 to schedule bandwidth in the network 100, a situation awareness update and selection module 570, and a shortest path routing module 575. Bandwidth scheduling module 560 may include logic instructions encoded in a tangible computer-readable medium which, when executed by processor 522, cause the processor 522 to perform the operations depicted in FIG. 3 to schedule bandwidth on each node in the network 100. Situation awareness operations module 570 may include logic instructions encoded in a tangible computer-readable medium which, when executed by processor 522, cause the processor to perform the operations depicted in FIG. 3 to maintain network situation awareness on each node in the network 100. Shortest path routing module 575 may include logic instructions encoded in a tangible computer-readable medium which, when executed by processor 522, cause the processor to perform a shortest path routing depicted in FIG. 3 to transmit this node's latest network situation awareness out to its neighboring nodes in the network 100.

In the foregoing discussion, specific implementations of exemplary processes have been described, however, it should be understood that in alternate implementations, certain acts need not be performed in the order described above. In alternate embodiments, some acts may be modified, performed in a different order, or may be omitted entirely, depending on the circumstances. Moreover, in various alternate implementations, the acts described may be implemented by a computer, controller, processor, programmable device, firmware, or any other suitable device, and may be based on instructions stored on one or more computer-readable media or otherwise stored or programmed into such devices (e.g. including transmitting computer-readable instructions in real time to such devices). In the context of software, the acts described above may represent computer instructions that, when executed by one or more processors, perform the recited operations. In the event that computer-readable media are used, the computer-readable media can be any available media that can be accessed by a device to implement the instructions stored thereon.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method comprising:

receiving, at a first node device of a communication network, first situational awareness information from a second node device within range of the first node device, wherein the first situational awareness information includes a data frame associated with a first time, wherein the data frame includes first link information corresponding to a link between the second node device and a third node device at the first time;

storing a portion of the first situational awareness information at the first node device; after storing the portion of the first situational awareness information, routing network traffic at the first node device based on second situational awareness information stored at the first node device, wherein the second situational awareness information is common to the first node device, the second node device, and the third node device, wherein the second situational awareness information includes second link information corresponding to the link between the second node device and the third node device at a second time, the second time after the first time;

after routing the network traffic at the first node device based on the second situational awareness information, routing second network traffic at the first node device based on the first situational awareness information;

determining, based on the second situational awareness information, shortest routing paths from the first node device to a plurality of node devices;

determining, based on the shortest routing paths, a maximum network hop parameter;

storing the maximum network hop parameter at a situational awareness information frame, wherein the situational awareness information frame is associated with a time tag indicating that a current time is a generation time for the situational awareness information frame; and transmitting third situational awareness information, wherein the third situational awareness information is distinct from the first situational awareness information and the second situational awareness information, and wherein the third situational awareness information includes the maximum network hop parameter.

2. The method of claim 1, wherein the second situational awareness information is associated with a particular situational awareness information frame that is selected from a plurality of situational awareness information frames based on a particular frame number of the particular situational awareness information frame.

3. The method of claim 2, wherein the particular frame number is equal to a maximum number of hops for a message to reach every node of the communication network via a shortest route from the first node device.

4. The method of claim 1, wherein storing the first situational awareness information at the first node device includes generating a first frame of a plurality of situational awareness information frames based on the first situational awareness information, wherein the second situational awareness information is stored in a second frame of the plurality of situational awareness information frames, and wherein the third situational awareness information is stored in the first frame.

5. The method of claim 4, wherein the first situational awareness information is received during a first scheduling time period, and further comprising:

receiving, during a second scheduling time period, fourth situational awareness information from the second node device;

generating a third frame of the plurality of situational awareness information frames based on the fourth situational awareness information; and updating multiple frame numbers corresponding to multiple frames of the plurality of situational awareness information frames.

6. The method of claim 4, wherein the first frame is generated based on fourth situational information received from the third node device.

7. A system comprising:

a processor coupled to a first node device of a communication network;

a memory module coupled to the processor, wherein the memory module includes instructions that, when executed by the processor, cause the processor to perform operations comprising:

receiving, at the first node device of the communication network, first situational awareness information from a second node device within range of the first node device, wherein the first situational awareness information includes a data frame associated with a first time, wherein the data frame includes first link information corresponding to a link between the second node device and a third node device at the first time;

storing a portion of the first situational awareness information at the first node device;

after storing the portion of the first situational awareness information, routing network traffic at the first node device based on second situational awareness information stored at the first node device, wherein the second situational awareness information is common to the first node device, the second node device, and the third node device, wherein the second situational awareness information includes second link information corresponding with the link between the second node device and the third node device at a second time, the second time after the first time;

after routing the network traffic at the first node device based on the second situational awareness information, routing second network traffic at the first node device based on the first situational awareness information;

determining, based on the second situational awareness information, shortest routing paths from the first node device to a plurality of node devices;

determining, based on the shortest routing paths, a maximum network hop parameter;

storing the maximum network hop parameter at a situational awareness information frame, wherein the situational awareness information frame is associated with a time tag indicating that a current time is a generation time for the situational awareness information frame; and transmitting third situational awareness information, wherein the third situational awareness information is distinct from the first situational awareness information and the second situational awareness information, and wherein the third situational awareness information includes the maximum network hop parameter.

8. The system of claim 7, wherein the operations further include updating situational awareness information associated with a plurality of situational awareness information frames at the first node device based on the first situational awareness information.

9. The system of claim 8, wherein a first frame of the plurality of situational awareness information frames is associated with a third time corresponding to when the first frame was generated, wherein the first situational awareness information includes node status information associated with a fourth time corresponding to when the node status information was generated, and wherein the first frame is updated with the node status information when the third time corresponds to the fourth time.

10. The system of claim 7, wherein the first situational awareness information comprises a second maximum network hop parameter that indicates a maximum number of hops for a message to reach every node of the communication network when taking a shortest routing path from the second node device.

11. The system of claim 7, wherein storing the first situational awareness information at the first node device includes generating a first frame of a plurality of situational awareness information frames based on the first situational awareness information, wherein the second situational awareness information is stored in a second frame of the plurality of situational awareness information frames, and wherein the operations further comprise transmitting the third situational awareness information to the third node device.

12. A non-transitory computer-readable medium comprising instructions that, when executed by a processor, cause the processor to perform operations comprising:

receiving, at a first node device of a communication network, first situational awareness information from a second node device within range of the first node device, wherein the first situational awareness information includes a data frame associated with a first time, wherein the data frame includes first link information corresponding to a link between the second node device and a third node device at the first time;

storing a portion of the first situational awareness information at the first node device;

after storing the portion of the first situational awareness information, routing network traffic at the first node device based on second situational awareness information stored at the first node device, wherein the second situational awareness information is common to the first node device, the second node device, and the third node device, wherein the second situational awareness information includes second link information corresponding with the link between the second node device and the third node device at a second time, the second time after the first time;

after routing the network traffic at the first node device based on the second situational awareness information, routing second network traffic at the first node device based on the first situational awareness information;

determining, based on the second situational awareness information, shortest routing paths from the first node device to a plurality of node devices;

determining, based on the shortest routing paths, a maximum network hop parameter; storing the maximum network hop parameter at a situational awareness information frame, wherein the situational awareness information frame is associated with a time tag indicating that a current time is a generation time for the situational awareness information frame; and transmitting third situational awareness information, wherein the third situational awareness information is distinct from the first situational awareness information and the second situational awareness information, and wherein the third situational awareness information includes the maximum network hop parameter.

13. The non-transitory computer-readable medium of claim 12, wherein the operations further comprise updating situational awareness information associated with a plurality of situational awareness information frames at the first node device based on the first situational awareness information.

14. The non-transitory computer-readable medium of claim 13, wherein a first frame of the plurality of situational awareness information frames is associated with a third time corresponding to when the first frame was generated, wherein the first situational awareness information includes node status information associated with a fourth time corresponding to when the node status information was generated, and wherein the first frame is updated with the node status information when the third time corresponds to the fourth time.

15. The non-transitory computer-readable medium of claim 13, wherein the second network traffic is routed during a time period after the network traffic is routed, wherein the time period is based on a difference between the first time and the second time.

16. The non-transitory computer-readable medium of claim 12, wherein the operations further comprise:

generating a path routing table from the first node device to each other node device of the communication network based on the second situational awareness information; and routing network traffic at the first node device using the second situational awareness information and the path routing table.

17. The non-transitory computer-readable medium of claim 12, wherein the first situational awareness information comprises a second maximum network hop parameter that indicates a maximum number of hops for a message to reach every node of the communication network when taking a shortest routing path from the second node device.

* * * * *